United States Patent [19]
Maeda et al.

[11] Patent Number: 5,790,301
[45] Date of Patent: Aug. 4, 1998

[54] OPTICAL FILTER MODULE AND OPTICAL AMPLIFICATION USING IT

[75] Inventors: Hidenari Maeda; Takashi Watanabe; Toshio Nakamura; Manabu Wakabayashi, all of Tokyo, Japan

[73] Assignee: Oki Electric Industry Co., Ltd., Tokyo, Japan

[21] Appl. No.: 805,559

[22] Filed: Feb. 25, 1997

[30] Foreign Application Priority Data

Jun. 6, 1996 [JP] Japan ................... 8-143805

[51] Int. Cl.$^6$ ................. H01S 3/00; G02B 27/14
[52] U.S. Cl. ................. 359/337; 359/127; 359/634
[58] Field of Search ................. 359/124, 127, 359/333, 337, 634

[56] References Cited

U.S. PATENT DOCUMENTS

| | | | |
|---|---|---|---|
| 4,707,064 | 11/1987 | Dobrowolski et al. | 350/96.19 |
| 5,113,277 | 5/1992 | Ozawa et al. | 359/127 |
| 5,457,558 | 10/1995 | Yokoyama | 359/124 |
| 5,521,733 | 5/1996 | Akiyama et al. | 359/127 |

*Primary Examiner*—Mark Hellner

[57] ABSTRACT

In an optical filter module and an optical amplification apparatus for a wavelength division multiplex (WDM light), the respective wavelength intervals of the plural passing center wavelengths and the filter characteristics in the vicinities of the respective center wavelengths can be set independently, whereby the BPF1 is provided with different passing center wavelengths $\lambda 1, \lambda 2 \ldots \lambda n$ and different filter characteristics. And, when the WDM signal light including wavelengths $\lambda 1, \lambda 2 \ldots \lambda n$ is inputted into the port 2-1a, the $\lambda k$ (k=1,2 ... n) component is transmitted by the corresponding BPF1-k, and the transmitted light is multiplexed sequentially and outputted from the port 2-nb and the other wavelength components (noise light components) are reflected by all of the BPFs and outputted from the port 2-nc. When the WDM signal light including wavelengths except for $\lambda 1, \lambda 2 \ldots \lambda n$ is inputted into the port 2-nc, the component of the wavelength $\lambda n$ (noise light component) is outputted from the port 2-1d and the other wavelength components are outputted from the port 2-1a. And, the optical coupler 6 monitors the output light of the BPF 1 to perceive the levels of the respective wavelength components in the WDM signal light.

12 Claims, 13 Drawing Sheets

1-1: BPF (TRANSMITTING λ1, REFLECTING THE OTHERS)
1-2: BPF (TRANSMITTING λ2, REFLECTING THE OTHERS)
3: OPTICAL FIBER
4: BPF MODULE
5: LENSES

1: BPF
15: 100% REFLECTING MIRROR
16: 95% REFLECTING MIRROR
17: PIN PHOTO DIODE
18: PIN PHOTO DIODE
3: OPTICAL FIBER TRANSMISSION PATH
5: LENS

OPTICAL FILTER MODULE AND OPTICAL AMPLIFICATION USING IT

BACKGROUND OF THE INVENTION

1. Field of the Invention

The present invention relates to an optical filter module for a wavelength division multiplex light (hereinafter, called WDM light) in which plural lights with different wavelengths are wavelength division multiplexed, and an optical amplification apparatus using it.

2. Description of the Related Art

A WDM signal light amplified by an optical amplifier in a WDM optical amplification transmission system includes noise lights (amplified spontaneous emission: ASE lights) which produce noise in the optical amplifier, so that when the WDM signal light is inputted to an optical amplifier in the next stage, the amplification efficiency of the optical amplifier in the next stage deteriorates. FIG. 15 shows the structure of the WDM optical amplification transmission system. In FIG. 15, a reference "A" shows an optical spectrum of a WDM signal inputted to an optical amplifier 101, which includes four signal lights of wavelengths $\lambda 1$, $\lambda 2$, $\lambda 3$, $\lambda 4$. A reference "B" shows an optical spectrum of the WDM signal light amplified by the optical amplifier, which includes ASE light components produced in the optical amplifier 101. A reference "C" shows an optical spectrum of the WDM signal amplified in the optical amplifier 102, which includes ASE optical components produced in the optical amplifiers 101, 102.

To prevent the amplification efficiency from deteriorating due to mixing with the ASE light components, an optical filter, which uses the respective signal optical wavelengths of the normal WDM signal light as plural passing center wavelengths, is arranged in the optical transmission path.

Conventionally, a Fabry-Perot etalon or the like is used as the optical filter with plural passing center wavelengths as above described. FIG. 16 shows a structure of the Fabry-Perot etalon. The Fabry-Perot etalon shown in FIG. 16 is that reflecting films 107a, 107b of reflectance R are formed on optical incoming-outgoing surfaces of a glass body of refractive index n and thickness 1 and is allocated in air. And, steepness of the passing center frequency is determined based on the reflectance R, namely, as R becomes larger, the passing center frequency becomes steeper. Further, a frequency interval $\Delta v$ of the passing center frequency for a light beam of an incident angle $\theta$ is determined by the following formula when c represents the light velocity;

$$\Delta v = c/(2nl \cos \theta).$$

FIG. 17 shows a filter characteristic of the Fabry-Perot etalon, and the $\lambda 1$, $\lambda 2$, $\lambda 3$, $\lambda 4$ in FIG. 17 represent the passing center frequencies. When the above Fabry-Perot etalon is used to eliminate the ASE lights in the WDM optical amplification transmission system, "n", "1" and "$\theta$" are determined in a manner that the intervals $\Delta v$ of the passing center frequencies coincide with frequency intervals of respective signal lights and the passing center frequencies $\lambda 1$, $\lambda 2$, $\lambda 3$, $\lambda 4$ coincide with frequencies of the respective signal lights.

However, the above-described conventional optical filter has some limitations, such as the intervals of the passing center wavelengths are regular, so that it can not be applied to the WDM light including plural signal lights of which wavelength intervals are irregular, and the steepness of the filter characteristic is determined by the reflectance R, so that a passing bandwidth and a blocking band attenuation characteristic can not be selected every signal. Thus, the conventional optical filter can be applied to only some WDM optical transmissions of limited signal wavelength arrangements, so that those become difficulties to make the WDM optical transmission system to be flexible.

The present invention is to solve these conventional problems and has its object to provide an optical filter in which respective wavelength intervals of plural passing center wavelengths and filter characteristics in the vicinities of the respective center wavelengths can be set independently and an optical amplification apparatus using it at a high amplification efficiency.

SUMMARY OF THE INVENTION

To achieve the above object, an optical filter module comprises: a first band pass filter, a second band pass filter . . . , and a Nth band pass filter having different passing center wavelengths, respectively, in which N represents an integer and is equal to or more than two; a first external connection port and a second external connection port; and, a optical guide unit. The optical guide unit makes a input light from the first external connection port incident into a first surface of the first band pass filter, performs optical multiplex-demultiplex, in order from the first band pass filter and the second band pass filter to a (N−1)th band pass filter and the Nth band pass filter, for making a first reflecting light of a kth band pass filter incident into a first surface of a (k+1)th band pass filter, in which k represents an integer between equal to or more than one and equal to or more than N−1, and for reflecting a second surface output light of the kth band pass filter at a second surface of the (k+1)th band pass filter to multiplex the second surface output light of the kth band pass filter with a transmitted light from a first surface to the second surface of the (k+1)th band pass filter, and outputs multiplex transmitted light from the first band pass filter to the Nth band pass filter to be a second surface output light of the Nth band pass filter from the second external connection port.

According to the optical filter module of the present invention, the plural band passes of the different passing center wavelengths are used and a filter characteristic such as a passing center wavelength value, a passing bandwidth, and an attenuation characteristic is selected for each band pass filter, whereby the respective wavelength intervals of the plural passing center wavelengths and the filter characteristics in the vicinities of the respective center wavelengths can be set independently. And, when a WDM signal light including no signal lights with the passing center wavelengths of the respective band pass filters is inputted into the first external connection port, the band pass filter passing center wavelength components of the noise light included in the WDM signal light are demultiplexed from the WDM signal light and outputted into the second external connection port, therefore, the noise light level included in the WDM signal light can be perceived.

In the second optical filter module, the optical guide unit makes a input light from the second external connection port is made incident into a second surface of the Nth band pass filter, performs optical multiplex-demultiplex, in order from the Nth band pass filter and the (N−1)th band pass filter to the second band pass filter and the first band pass filter, for making a second surface reflecting light of the (k+1)th band pass filter incident into a second surface of the kth band pass filter, and for reflecting a first surface output light of the (k+1)th band pass filter by a first surface of the kth band pass filter to multiplex the first surface output light of the (k+1)th band pass filter with a transmitted light from a first surface to the second surface of the kth band pass filter; and outputs a multiplex transmitted light from the Nth band pass filter to the first band pass filter to be a second surface output light of the first band pass filter.

With this arrangement, the second optical filter module can be applied to a bidirectional optical transmission path.

In the third optical filter module, the optical guide means further comprises a third external connection port and a four external connection port; and makes a input light from the second external connection port incident into a first surface of the Nth band pass filter, performs optical multiplex-demultiplex, in which in order from the Nth band pass filter and the (N−1)th band pass filter to the second band pass filter and the first band pass filter, a first reflecting light of the (k+1)th band pass filter is made incident into a first surface of the kth band pass filter, and the second surface output light of the (k+1)th band pass filter is multiplexed with a transmitted light from a first surface to the second surface of the (k+1)th band pass filter, and outputs a multiplex transmitted light from the Nth band pass filter to the first band pass filter to be a second surface output light of the first band pass filter and outputs a first reflecting light of the first band pass filter from the first external connection port.

With this arrangement, the third optical module can be applied to two-way optical transmission paths. When the WDM signal light including only the signal light with the passing center wavelengths of the respective band pass filters is inputted into the fourth external connection port, the other components except for the band pass filter passing center wavelengths of the noise light included in the WDM signal light are demultiplexed from the WDM signal light and outputted into the first connection port, therefore, the noise light level included in the WDM signal light can be perceived.

In the fourth optical filter module, in addition to the third optical filter module, the optical guide unit makes a input light from the third external connection port is made incident into a second surface of the first band pass filter, performs optical multiplex-demultiplex, in which in order from the first band pass filter and the second band pass filter to the (N−1) band pass filter and the Nth band pass filter, a second reflecting light of the kth band pass filter is made incident into a second surface of the (k+1)th band pass filter, and a first surface reflecting light of the kth band pass filter is reflected at a first surface of the (k+1)th band pass filter to multiplex with a transmitted light from a second surface to the first surface of the (k+1)th band pass filter, and outputs a multiplex transmitted light from the first band pass filter to the Nth band pass filter to be a first surface output light of the Nth band pass filter from the fourth external connection port and outputs a second reflecting light of the Nth band pass filter from the second external connection port.

With this arrangement, the fourth optical filter module can be applied to two-way bidirectional optical transmission path.

In the fifth optical filter module, the optical guide unit branches output lights of predetermined band pass filters and outputs the output light to outside, respectively.

According to the fifth optical filter module, the gathered-separated output lights from the respective band pass filters are branched, respectively, and the powers thereof are monitored, whereby the presences and levels of the respective signal light in the inputted WDM signal light can be perceived.

In the sixth optical filter module, the optical guide unit is provided with optical transmitters provided with lenses at both sides of the optical fiber for converging lights from band pass filters and for making the lights from the optical fiber in parallel to be incident into a band pass filter, and two optical transmitters are each provided between the band pass filters.

In seventh optical filter module, the optical guide unit comprises optical transmitters arranged between band pass filters two each and provided with lenses at both sides of an optical fiber for converging lights from band pass filters and for making lights from the optical fiber in parallel to be incident into a band pass filter, and an optical coupler arranged in the optical fiber for branching a light transmitting through the optical fiber and for outputting a branched light from a branch port.

In the eighth optical filter module, the optical guide unit is that a pair of first reflecting mirrors for beam-connection between first surfaces of two band pass filters and a pair of second reflecting mirrors for beam-connection between second surfaces are each arranged between the band pass filters for optical multiplexing-demultiplexing.

In the ninth optical filter module, in addition to the fifth optical filter module, the optical guide unit is that a pair of first reflecting mirrors for beam-connection between first surfaces of two band pass filters and a pair of second reflecting mirrors for beam-connecting between second surfaces are each arranged between band pass filters, half reflecting mirrors transmitting a part of an incident light quantity are used as the first reflecting mirrors, the second reflecting mirrors or both thereof, and transmitted lights of the half reflecting mirrors are outputted to outside as branch lights of the output lights of the band pass filters.

According to the eighth or ninth optical filter module, the beam-connection with half mirrors can fabricate an optical filter module at a lower loss than an optical fiber connection. And, parts can be reduced, so that an optical filter module can be miniaturized and lower at low cost.

In the tenth optical filter module, in addition to the eighth or ninth optical filter module, the first reflecting mirrors provided plurally, the second reflecting mirrors provided plurally or both thereof divide a reflection surface area of one reflecting mirror and allocate respective divided areas.

In eleventh optical filter module, the first band pass filter, the second band pass filter . . . , and the Nth band pass filter are that an effective area of one band pass filter of which passing center wavelength varies corresponding to positions is divided into N pieces and respective divided areas are allocated.

According to the tenth and eleventh optical filter modules, the reflecting mirrors and the band pass filter are integrated, whereby parts can be further reduced, so that the optical filter module can be miniaturized and lower cost.

Then, in an optical amplification apparatus of the present invention, one of from first to eleventh optical filter module is arranged at an input side or an output side of said optical amplification apparatus, or these optical filter modules are arranged at both of the input side and the output side.

In another optical amplification apparatus provided with an optical pre-amplifier and an optical post-amplifier, one of from first to eleventh optical filter module is arranged between the optical pre-amplifier and the optical post-amplifier.

Further another optical amplification apparatus comprises, a first optical amplifier and a second optical amplifier, a first optical filter module according to one of from third to eleventh optical filter module, in which a first external connection port is connected with a first transmission path, a second external connection port is connected with an input of the first amplifier and a fourth external connection port is connected with an output of the second optical amplifier, and a second optical filter module according to one of from the third to the eleventh optical filter module, in which a first external connection port is connected with the second amplifier, a second external connection port is connected with a second transmission path and a third external connection port is connected with an output of the second optical amplifier; and an input light from the first transmission path is amplified and outputted into the second transmission path, and an input light from the second transmission path is amplified and outputted into the first transmission path.

According to the above optical amplification apparatus, an optical amplification apparatus of the low noise light output and the high amplification efficiency can be obtained and the excitation light power can be reduced by improving the amplification efficiency, so that the consumption power and the failure rate of excitation light sources can be reduced. Therefore, an optical amplification apparatus of the low consumption power and the high reliability can be obtained. And, the noise light level of the inputted WDM signal light is monitored, whereby the presence of the performance degradation in the optical amplification apparatus can be also monitored based on the noise light level. Moreover, the powers of the multiplex-demultiplex output lights at the respective band pass filters are monitored, whereby the presences and the levels of the respective signal lights in the input-output WDM light can be perceived.

BRIEF DESCRIPTION OF THE DRAWINGS

The present invention will become more fully understood from the detailed description given hereinbelow and the accompanying drawings in which.

DETAILED DESCRIPTION OF THE PREFERRED EMBODIMENTS

Preferred embodiments of the present invention will now be described with reference to the accompanying drawings.

EXAMPLE 1

Figure 1:
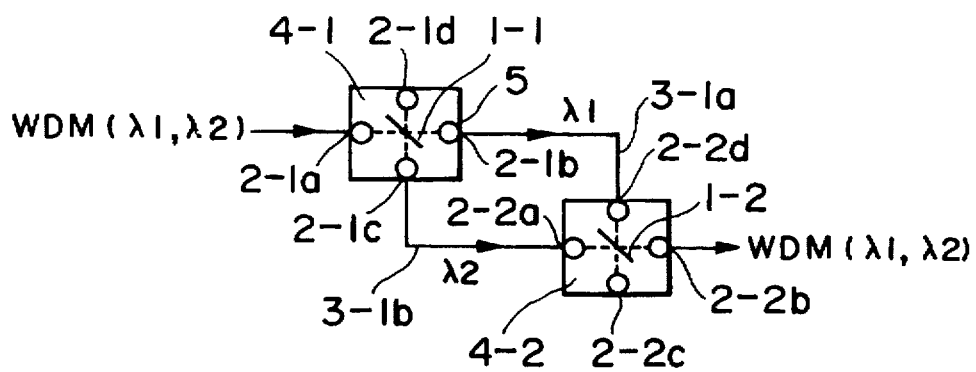
FIG. 1 is a view showing a structure of an optical filter module (two-stage BPF) according to the first embodiment of the present invention.

FIG. 1 shows a structure of an optical filter module according to the first embodiment of the present invention, and a band pass filter (BPF) module 4-1 and a BPF module 4-2 are connected by optical fibers 3-1a, 3-1b.

The BPF module 4-1 is provided with a BPF 1-1 and four optical fiber ports 2-1a, 2-1b, 2-1c, 2-1d with lenses. And, the BPF module 4-2 is provided with a BPF 1-2 and four optical fiber ports 2-2a, 2-2b, 2-2c, 2-2d with lenses. The port 2-1a and the port 2-2b are external connection ports, the port 2-1b and the port 2-2d are connected by the optical fiber 3-1a, and the port 2-1c and the port 2-2a are connected by the optical fiber 3-1b.

Figure 2:
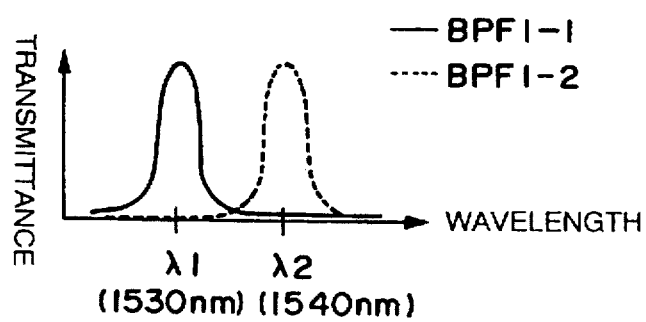
FIG. 2 is a view showing a characteristic of the BPF in the optical filter module (two-stage BPF) according to the first embodiment of the present invention.

FIG. 2 shows filter characteristics of the BPF 1-1 and the BPF 1-2. The BPF 1-1 passes $\lambda 1$ through as a center wavelength and is a dielectric multi-layer film filter, for instance, which has the passing wavelength bandwidth of 1530±1 [nm] in the case of $\lambda 1=1530$ [nm]. And, the BPF 1-2 passes $\lambda 2$ through as a center wavelength and is a dielectric multi-layer film filter, for instance, which has the passing wavelength bandwidth of 1540±1 [nm] in the case of $\lambda 2=1540$ [nm].

Returning to FIG. 1, the optical fiber port 2 is each provided with a lens 5. The lens 5 is used to structure an optical collimator together with the optical fiber 3, converts the incident lights from the optical fiber to parallel beams so as to input into the BPF 1 and converges parallel beams transmitted through the BPF 1 or reflected thereby to the optical fiber 3 connected to the port 2, and a glass lens or the like is used as the lens 5. And, a single mode fiber or the like is used as the optical fiber 3.

Next, the explanation will be given of the operation in the optical filter module shown in FIG. 1. First, an optical filter function will be explained.

In addition, the WDM signal light is shown like a WDM ($\lambda 1$, $\lambda 2$) by using the wavelengths of the component signal lights. The WDM (λ1, λ2) shows the WDM signal including two signals of wavelengths λ1, λ2. And, each single wavelength signal light is shown like a S (λ1) by using the wavelength thereof. Further, a wavelength component of the ASE light is shown like a ASE (λ1) by using the wavelength thereof.

When the WDM (λ1, λ2) is inputted to the external connection port 2-1a, the BPF 1-1 transmits only the λ1 component of the WDM (λ1, λ2), namely, S(λ1) into the port 2-1b and reflects the other components to the port 2-1c. The S (λ1) transmitting through the BPF 1-1 is transmitted through the optical fiber 3-1a and inputted to the port 2-2d, and then is reflected to the port 2-2b in the BPF 1-2. And, the other wavelength components but the λ1, which are reflected by the BPF 1-1, are transmitted through the optical fiber 3-1b and inputted to the port 2-2a, and the BPF 1-2 transmits only the λ2 component of the wavelength components without λ1, namely, S(λ2) into the port 2-2b and reflects the other wavelength components to the port 2-2c. With this arrangement, the S(λ1) transmitting through the BPF 1-1, and the S(λ2) transmitting through the BPF 1-2, are multiplexed and outputted from the port 2-2b as the WDM (λ1, λ2). Moreover, the port 2-2b may be used as an external input port of the WDM signal light and the port 2-1a may be used as an external output port, or the ports 2-1d, 2-2c may be used as external connection ports, respectively.

Figure 3:
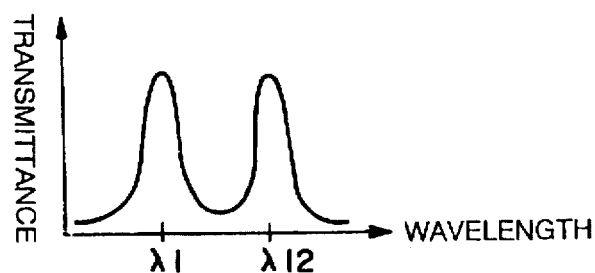
FIG. 3 is a view showing a filter characteristic of the optical filter module (two-stage BPF) according to the first embodiment of the present invention.

FIG. 3 shows the filter characteristic of the optical filter module. The optical filter module regards only the vicinities of the wavelength ranges of the two component signal lights as passing bandwidths and is provided with a function to shut out the other wavelength ranges, and a filter characteristic can be set independently for every passing center wavelength by selecting the BPFs 1-1, 1-2.

Figure 4:
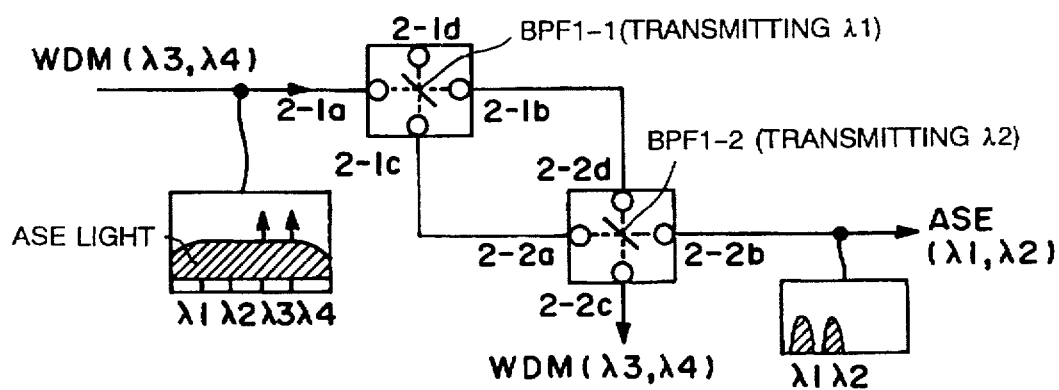
FIG. 4 is an explanatory view of a noise light monitor function of an optical filter module (two-stage BPF) according to the first embodiment of the present invention.

Next, the explanation will be given concerning the noise light monitor function. FIG. 4 is an explanatory view of the noise light monitor function in the optical filter module in FIG. 1. In FIG. 4, a WDM signal light, which does not include the S(λ1) and the S(λ2), such as a WDM (λ3, λ4), is inputted into the port 2-1a, the BPF 1-1 (passing center wavelength λ1) transmits only the λ1 component of the WDM (λ3, λ4) (corresponding to the λ1 component of the ASE light, namely, ASE (λ1) since there is no S (λ1) therein) to the port 2-1b, and the other wavelength components are reflected to the port 2-1c. And, the BPF 1-2 (passing center wavelength λ2) reflects the ASE (λ1) to the port 2-2b and transmits only the λ2 component of the WDM (λ3, λ4) without λ1 (corresponding to the λ2 component of the ASE light, namely, ASE (λ2)) to the port 2-2b, and the other wavelength components are reflected to the port 2-2c. Thus, the λ1 and λ2 components of the ASE light included in the WDM inputted into the port 2-1a, namely, the ASE (λ1,λ2) is outputted into the port 2-2b and the WDM (λ3,λ4) is outputted into the port 2-2c. The ASE light level included in the WDM (λ3,λ4) can be recognized based on the ASE (λ1,λ2). Moreover, when the WDM signal including only the S (λ1) and the S (λ2), namely, the WDM (λ1,λ2) is inputted into the port 2-1a, the other components except for the λ1, λ2 components of the ASE light included in the WDM (λ1,λ2) are outputted into the port 2-2c, so that the ASE light level included in the WDM (λ1,λ2) can be recognized.

Needless to say, the port 2-2b may be used as an external input port of the WDM (λ3,λ4) and the port 2-1a may be used as an external output port of the ASE (λ1,λ2), or the ports 2-1b, 2-2c may be used as external input-output ports of the WDM (λ3,λ4) and the ASE (λ1,λ2), respectively.

Further, in the optical filter module in FIG. 1, the ports 2-1a, 2-2b and the ports 2-1d, 2-2c may be used as input-output ports for the optical filter and input-output ports for the noise light monitor, whereby the optical filter function and the noise light monitor function may be provided at the same time. That is, in the optical filter module in FIG. 1, for instance, when the ports 2-1a, 2-2b are used for the optical filter and the ports 2-1d, 2-2c are used for the noise light monitor, and the port 2-1a is used as an input port of the WDM (λ1,λ2) and the port 2-2c is used as an input port of the WDM (λ3,λ4), the optical filter module is provided with an optical filter function filtering the WDM (λ1,λ2) inputted from the port 2-1a and then outputting them to the port 2-2b, a noise light monitor function outputting the ASE (λ1,λ2), which is included in the WDM (λ3,λ4) inputted from the port 2-1c, to the port 2-1d and a transmission function outputting the WDM (λ3,λ4) inputted from the port 2-2c to the port 2-1a.

Figure 5:
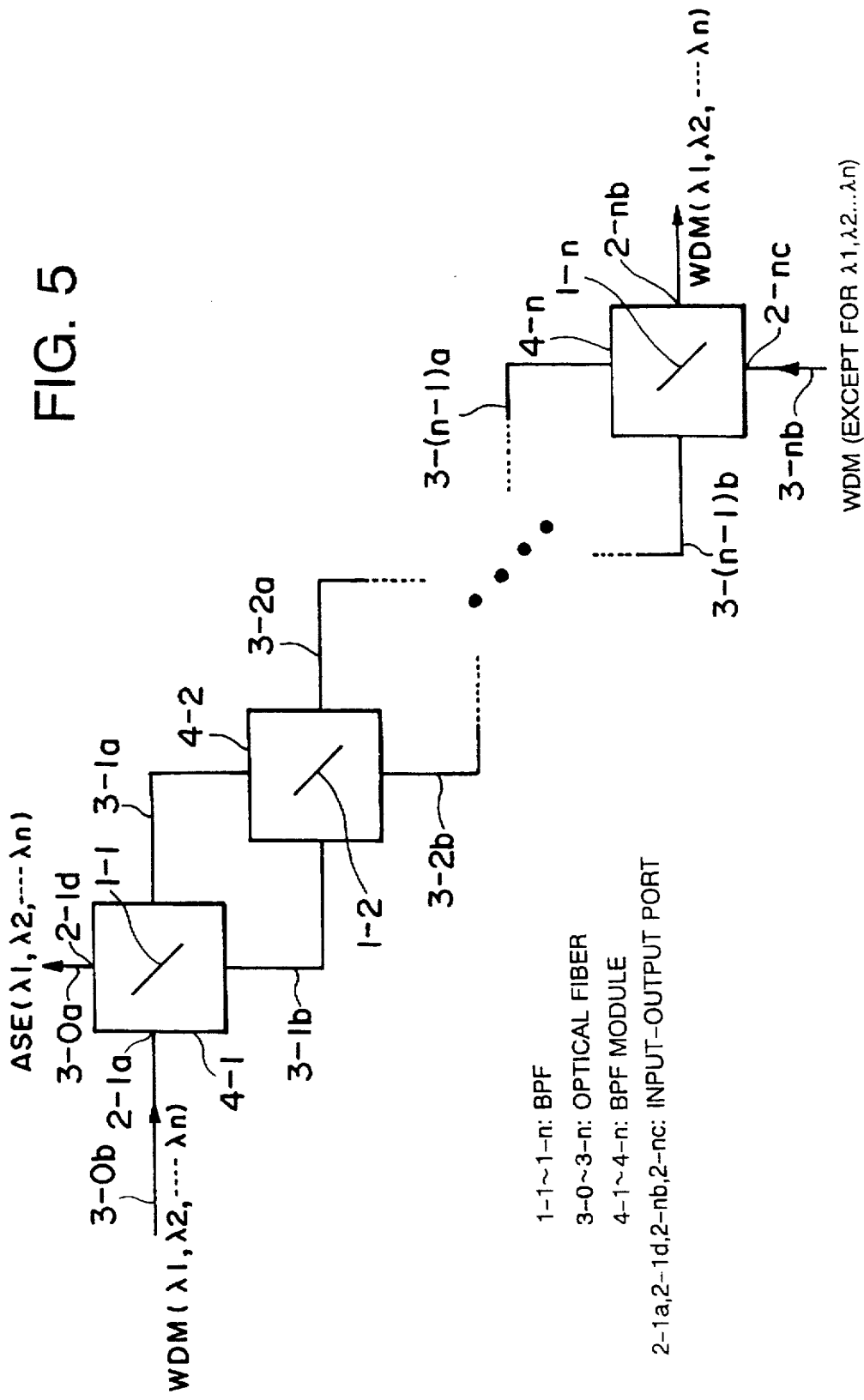
FIG. 5 is a view showing a structure of an optical filter module with n-stage BPF according to the first embodiment of the present invention.

As above described, the explanation has been given of the optical filter module in which the two BPF modules are connected. And besides, when a WDM signal includes n-kinds of signals with different wavelengths, an optical filter in which n-pieces of BPF modules are connected. An explanation will be given of the optical filter module including the n pieces of BPFs. FIG. 5 is a view showing a structure of the optical filter module with the n-stage BPFs according to the first embodiment of the present invention, in which the n-pieces of BPF modules 4-1 . . . 4-n are connected by the optical fibers 3-1 . . . 3-(n−1).

In FIG. 5, each BPF module 4-k [k=1, 2 . . . n], similarly to the BPF module 4-2 shown in FIG. 1 or the like, is provided with four optical fiber ports 2-k (internal ports are not shown) and a BPF 1-k which has a peculiar passing center wavelength and a peculiar filter characteristic (such as a passing bandwidth and a blocking band attenuation characteristic), respectively, and the ports 2-1a, 2-1d of the BPF module 4-1 and the ports 2-nb, 2-nc of the BPF module 4-n are used as input-output ports of external optical transmitters.

Next, the explanation will be given of the operation of the n-stage BPF optical filter shown in FIG. 5. The essential operation thereof is equivalent to that of the two-stage BPF optical filter module in FIG. 1. First, the explanation will be given of the optical filter function. For instance, when a WDM (λ1,λ2 . . . n) is inputted into the port 2-1a through the optical fiber transmission path 3-Ob, a S (λk) [k=1, 2 . . . n] is transmitted through only a corresponding BPF 1-k and reflected by the other BPFs, and finally reaches the port 2-nb. And, the other wavelength components (ASE light components in this case) except for the λ1,λ2 . . . λn components in the WDM (λ1,λ2 . . . λn) are reflected all of the BPFs. The WDM (λ1,λ2 . . . λn), in which the ASE light components of the other wavelengths except for the λ1,λ2 . . . λn are eliminated, is outputted into the optical fiber transmission path 3-na connected with the port 2nb.

Figure 6:
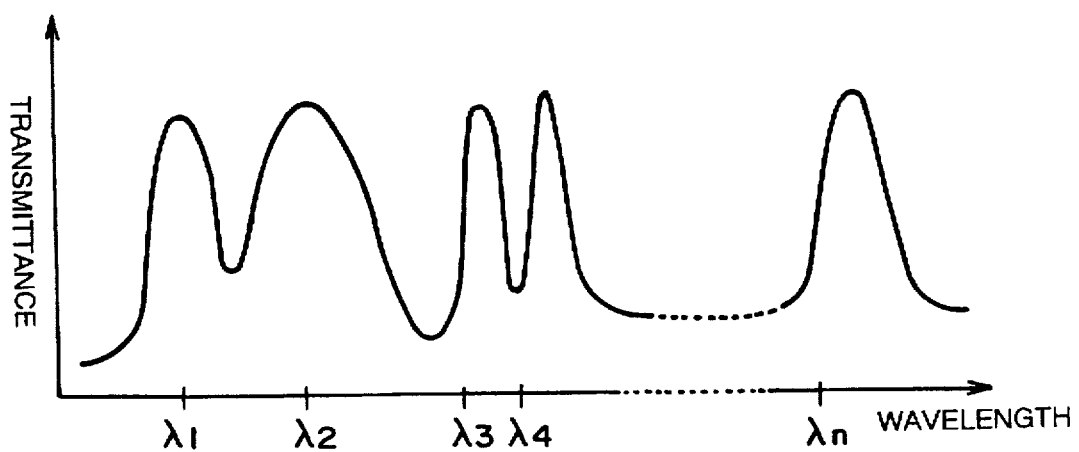
FIG. 6 is a view showing a filter characteristic of the optical filter module with n-stage BPF according to the first embodiment of the present invention.

FIG. 6 is a view showing a sample of the filter characteristic of the optical filter module in FIG. 5. The filter characteristics of the BPF 1-1 . . . 1-n are selected, whereby intervals of the respective passing center wavelengths can be set irregularly and the filter characteristics in the vicinities of the respective passing center wavelengths can be set independently.

Next, the explanation will be given of the noise light monitor function. A WDM (except for λ1,λ2 . . . λn) including no S (λ1), S (λ2) . . . S (λn), for instance, is inputted into the port 2-nc, the λk component of the ASE light included in the WDM (except for λ1,λ2 . . . λn) is transmitted through only the corresponding BPF 1-k and reflected by the other BPFs, and finally reaches the port 2-*id*. And, the other wavelength components except for the λ1,λ2 . . . λn wavelength components of the inputted WDM (except for λ1,λ2 . . . λn) are reflected by all of the BPFS. Thus, the ASE (λ1,λ2 . . . λn) included in the inputted WDM (except for λ1,λ2 . . . λn) is outputted from the port 2-*id*. The ASE light level of the input light can be obtained based on the ASE (λ1,λ2 . . . λn). Additionally, when the WDM (λ1,λ2 . . . λn) is inputted into the port 2-*nc*, the other wavelength components except for the λ1,λ2 . . . λn components of the ASE light included in the WDM (λ1,λ2 . . . λn) are outputted from the port 2-1*a*, and the ASE light level of the input light can be obtained thereby.

Figure 7:
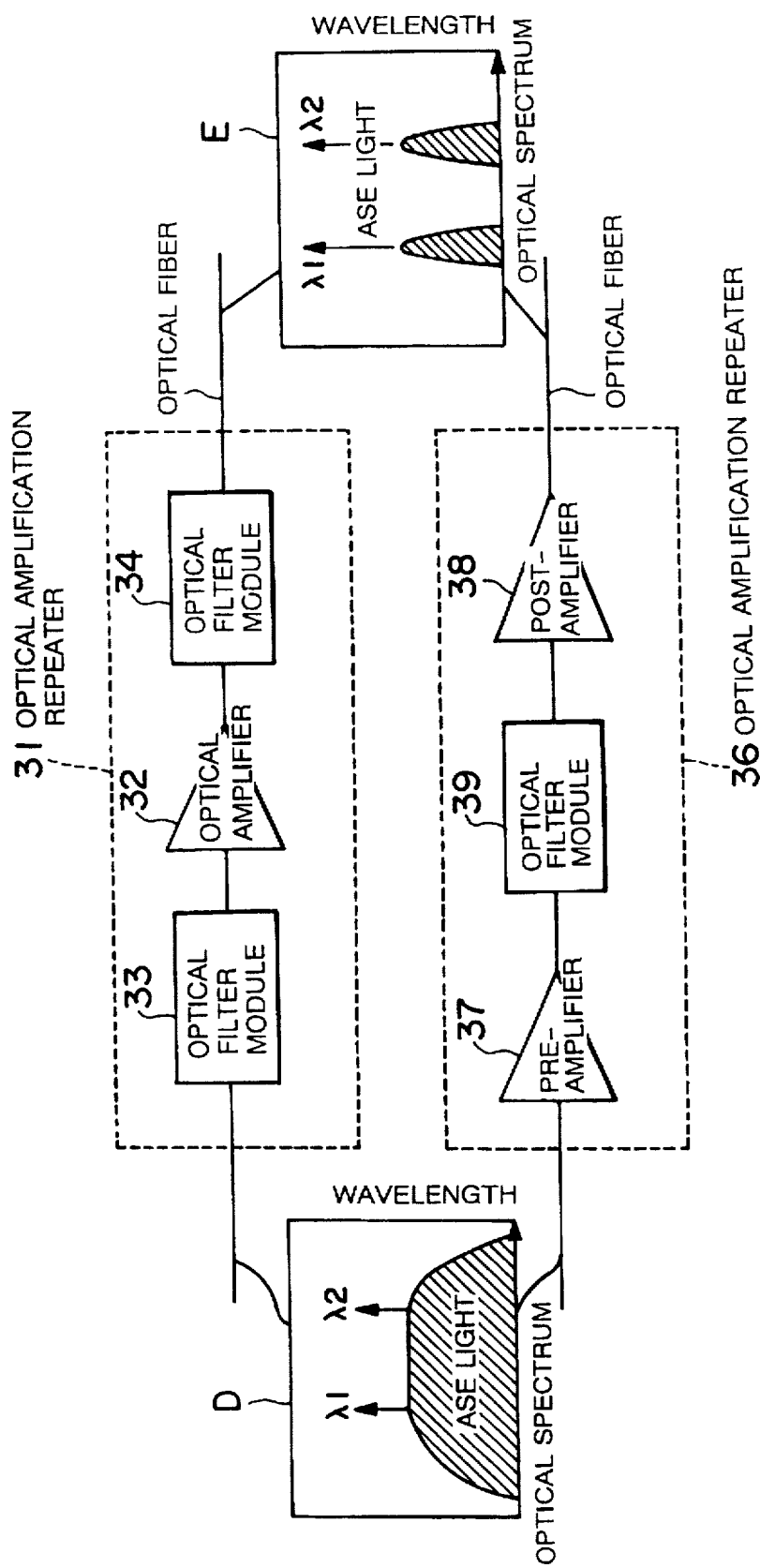
FIG. 7 is a view showing a sample in which the optical filter module according to the first embodiment of the present invention is applied to an optical amplification repeater.

Next, the explanation will be given of a sample using the optical filter module according to the first embodiment. FIG. 7 is a view showing an application sample in which the optical filter module according to the first embodiment is applied to an optical amplification repeater. As shown in FIG.7, an optical amplification repeater 31 is provided with one optical amplifier 32 (such as an erbium doped optical fiber amplifier) and optical filter modules 33, 34 according to the present invention arranged in front and in the rear of the optical amplifier 32. Additionally, taking a signal light loss produced in an optical filter module into consideration, only the optical filter module 33, or, only the optical filter module 34 may be arranged. And, an optical amplification repeater 36 is provided with two amplifiers such as a pre-amplifier 37 and a post-amplifier 38 so as to achieve a low noise and a high gain and an optical filter module 39 according to the present invention, which is arranged between the pre-amplifier 37 and the post-amplifier 38. When an optical filter module is arranged at the input side or the output side of the optical amplifier, an input signal light power or an output signal light power deteriorates because of signal loss in the optical filter module. However, the optical filter module is arranged between amplifiers as above described, this power deterioration can be avoided. Thus, a noise figure and a power of the output signal light can be improved. Additionally, in FIG. 7, a reference "D" shows an optical spectrum of the WDM (λ1,λ2) inputted into the optical amplification repeater 31 or 36 and a reference "E" shows an optical spectrum of the WDM (λ1,λ2) outputted from the optical amplification repeater 31 or 36.

In the optical amplification repeater 31, the other ASE light components except for the λ1,λ2 components included in the inputted WDM (λ1,λ2) are eliminated by the optical filter module 33, and this filtered WDM (λ1,λ2) is amplified by the optical amplifier 32 and the WDM (λ1,λ2) outputted from the optical amplifier 32 is filtered by the optical filter module 34 again.

As described above, the ASE light components except for the signal light wavelength components of the WDM (λ1, λ2) are eliminated in the optical filter module 33, so that the amplification efficiency of the optical amplifier 31 can be improved, and the accumulation of the noise lights can be reduced by filtering in the optical filter module 34. And, the excitation light power of the optical amplifier 31 can be reduced by improving the amplification efficiency, so that the consumption power of the optical amplifier 31 and the failure rate of the excitation light source can be reduced, therefore, the reliability of the optical amplifier 31 can be improved. Further, when the ASE light level of the WDM (λ1,λ2) is monitored in the optical filter module 34, it can be monitored to determined whether there is a performance degradation of the optical amplifier 31.

In the optical amplification repeater 36, the WDM (λ1,λ2) outputted from the pre-amplifier 37 is filtered by the optical filter module 39, and then inputted into the post-amplifier 38 and amplified in the post-amplifier 38.

With this arrangement, the amplification efficiency of the post-amplifier 38 can be improved and the ASE light power of the output light can be reduced. Therefore, the noise figure and the power of the output signal light can be improved as compared with an optical filter module which is arranged at the input side of the pre-amplifier 37 or at the output side of the post-amplifier 38. And, the excitation light power of the post-amplifier 38 can be reduced by improving the amplification efficiency, so that the consumption power of the post-amplifier 38 and the failure rate of the excitation light source can be reduced. Therefore, the reliability of the post-amplifier 38 can be improved. Further, when the ASE light level of the WDM (λ1,λ2) outputted from the pre-amplifier 37 is monitored, it can be monitored whether there is a performance degradation of the pre-amplifier 37.

According to the optical filter module of the first embodiment, plural BPFs with different passing center wavelength are used, and the filter characteristics such as passing center wavelength values, passing bandwidths and attenuation characteristics of the respective BPFs are selected, whereby the respective wavelength intervals of the plural passing center wavelengths and the filter characteristics in the vicinities of the respective center wavelengths can be set independently. And, the noise light included in the WDM signal light is demultiplexed so as to be outputted, so that the noise light level can be recognized.

And, an optical amplification apparatus such as an optical amplification repeater is fabricated with an optical filter module of the first embodiment, whereby an optical amplification apparatus of a low noise light output, a high amplification efficiency, a low consumption power and a high reliability can be obtained and it can be monitored whether there is a performance degradation of an optical amplifier.

EXAMPLE 2

Figure 8:
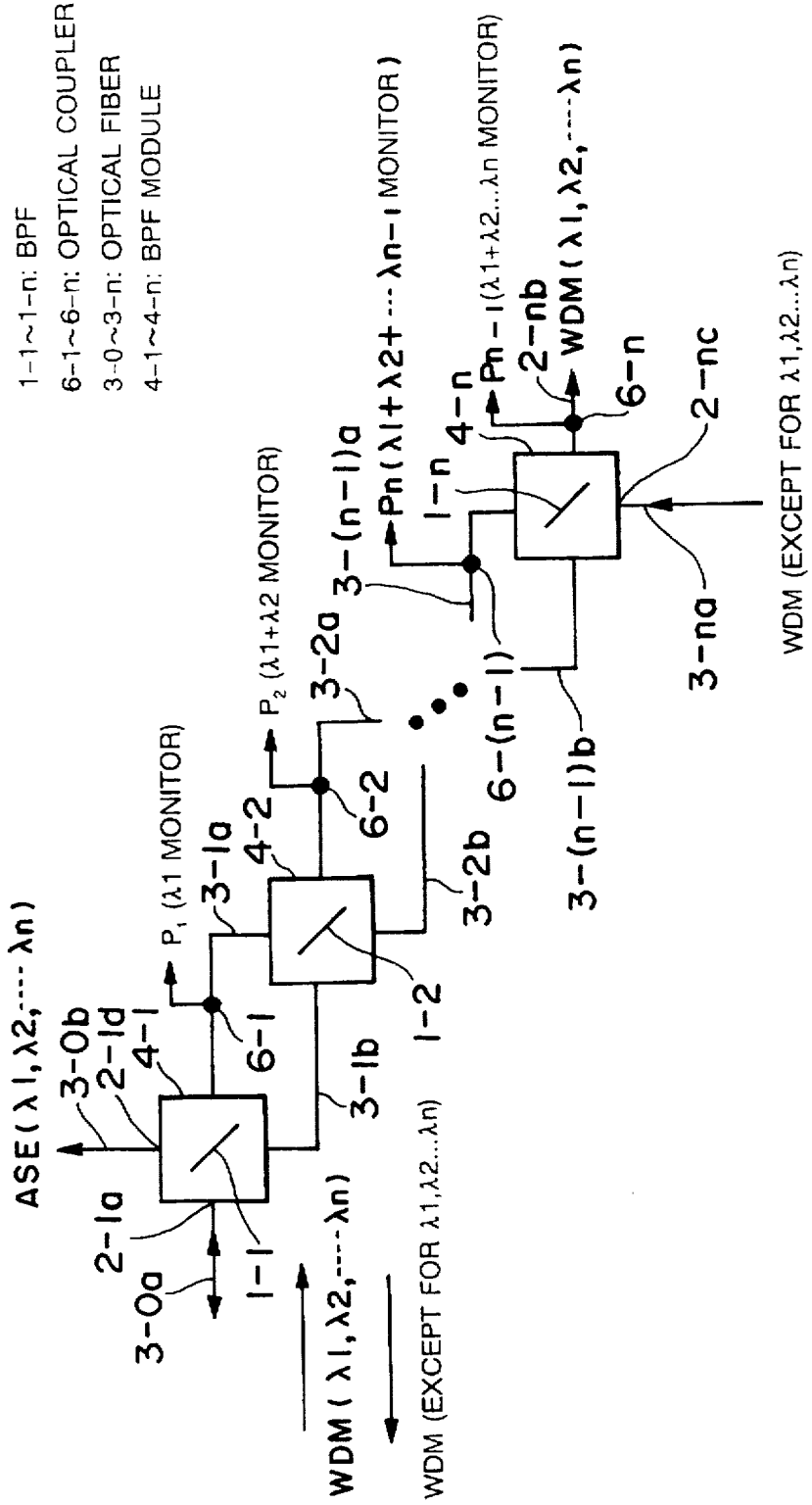
FIG. 8 is a view showing a structure of an optical filter module according to the second embodiment of the present invention.

FIG. 8 shows a structure of an optical filter module according the second embodiment of the present invention, which is provided with n-stage BPF modules. The optical filter module shown in FIG. 8 is provided with optical couplers 6-1 . . . 6-n at the optical fibers 3-1*a* . . . 3-*n*, respectively, in addition to optical filter module in FIG. 5.

Figure 9:
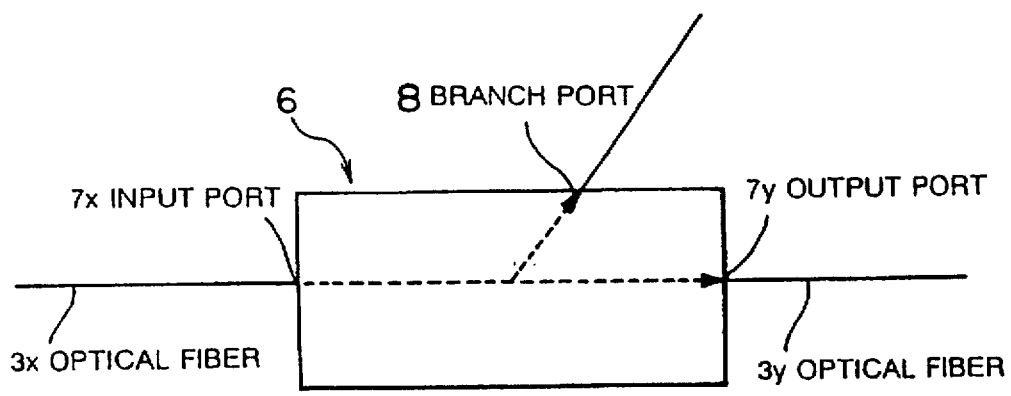
FIG. 9 is a view showing a structure of an optical coupler in the optical filter module according to the second embodiment of the present invention.

The optical coupler 6 branches a partial light quantity of transmission light in the optical fiber 3, and is provided to monitor the transmission light power of the optical fiber 3. For example, an optical coupler of branch loss 15 [dB] is used. As shown in FIG. 9, the optical coupler 6 is provided with an input port 7*x* connected with the optical fiber 3*x*, an output port 7*y* connected with the optical fiber 3*y* and a branch port 8, and branches a partial light quantity of a light transmitted from the input port 7*x* to the output port 7*y* and outputs it to the branch port 8. In the opposite direction, a light can be also transmitted from the output port 7*y* to the input port 7*x*. In this case, all of the light quantity of the transmission light is transmitted but branched. In the optical coupler of branch loss 15 [dB], the branch light power outputted from the branch port 8 loses 15 [dB] compared with the incident light power into the input port 7*x*. In this case, a loss of the light transmitted from the input port 7*x* to the output port 7*y* is about 0.14 [dB] and can be ignored.

Therefore, in FIG. 8, when the WDM (λ1,λ2 . . . λn) is inputted into the port 2-1*a*, the power of the S (λ1) transmitted through the BPF 1-1 can be monitored by the optical coupler 6-1, the power of the multi transmission light of the S (λ1) and the S (λ2) transmitted through the BPFs 1-1, 1-2 can be monitored by the optical coupler 6-2 and the power of the multi transmission light of the S (λ1), S (λ2) ... S (λn) transmitted through the BPFs 1-1, 1-2 ... 1-n can be monitored by the optical coupler 6-n.

Figure 10:
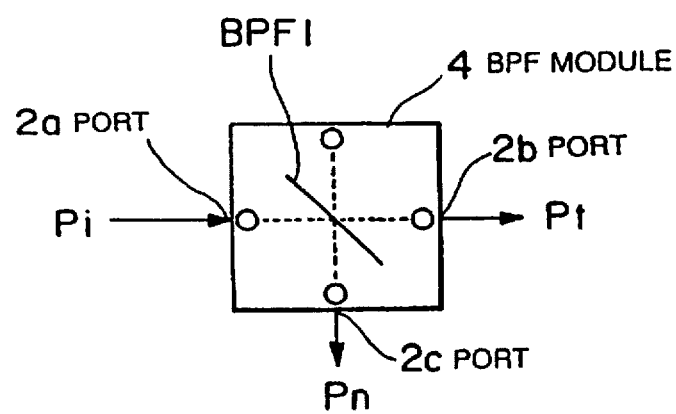
FIG. 10 is an explanatory view of optical loss in the BPF module of the optical filter module of the present invention.

When the powers of the monitor light are set as P1, P2 ... Pk ... Pn (k=1,2 ... n), and the power of the S (λk) in the WDM (λ1,λ2 ... λn) inputted into the port 2-1a is set as P (λk), there are the following relations;

$$P1 = \{P(\lambda 1) \cdot a1\} \cdot c$$

$$P2 = \{P(\lambda 2) \cdot b1 \cdot a2 + P1 \cdot b2\} \cdot c$$

$$Pk = \{P(\lambda k)\} \cdot (b1 \cdot a2 \ldots bk-1) \cdot ak + Pk-1 \cdot bk\} \cdot c$$

$$Pn = \{P(\lambda n) \cdot (b1 \cdot a2 \ldots bn-1) \cdot an + Pn-1 \cdot bn\} \cdot c,$$

wherein ak (k=1,2 ... n) represents a transmission loss, bk (k=1,2 ... n) represents a reflection loss and c represents a branch loss of the optical coupler 6. FIG. 10 is an explanatory view of the losses ak, bk in the BPF module 4. In FIG. 10, when the power of the light inputted into the BPF module 4 is represented by Pi, the power of the light transmitted through the BPF1 and outputted from the port 2b is represented by Pt, and the power of the light reflected by the BPF1 and outputted from the port 2c is represented by Pn ak=Pt/Pi and bk=Pn/Pi can be obtained. That is, the transmission loss ak is the loss when a light transmits through the BPF1-k, and the reflection loss bk is the loss when a light is reflected by the BPF1-k.

The respective signal light powers P (λ1) ... P (λn) can be calculated from the above formulae as follows;

$$P(\lambda 1) = (P1/c) \cdot (1/a1)$$

$$P(\lambda 2) = \{(P2/c) - P1 \cdot b2\} \cdot \{1/(a2 \cdot b1)\}$$

$$P(\lambda k) = \{(Pk/c) - Pk - 1 \cdot bk\} \cdot \{1/(ak \cdot b1 \ldots bk-1)\}$$

$$P(\lambda n) = \{(Pn/c) - Pn - 1 \cdot bn\} \cdot \{1/(an \cdot b1 \cdot b2 \ldots bn-1)\}.$$

Therefore, the powers P (λ1) ... (λn) of the respective signal lights included in the inputted WDM signal light can be obtained from the above formulae.

Figure 11:
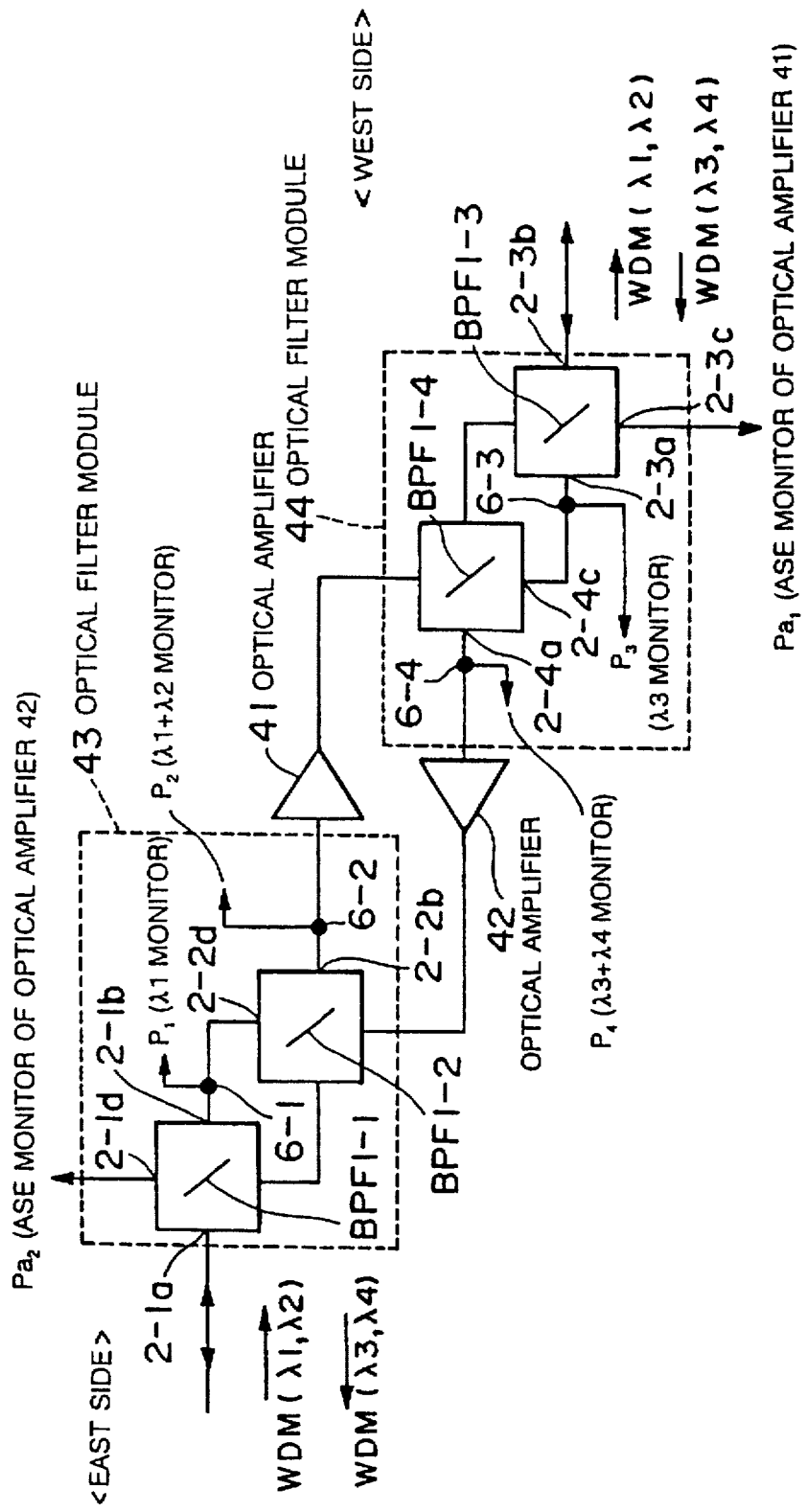
FIG. 11 is a view showing a sample in which an optical filter module according to the second embodiment of the present invention is applied to a bidirectional optical amplification repeater.

Next, the explanation will be given of a sample using optical filter module according to the second embodiment. FIG. 11 is a view showing a structure of a bidirectional optical amplification repeater with the optical filter module according to the second embodiment. The bidirectional optical amplification repeater is provided with an optical amplifier 41 amplifying the WDM (λ1,λ2) transmitted from the East side to the West side, an optical amplifier 42 amplifying the WDM (λ3,λ4) transmitted from the West side to the East side, and optical filter modules 43, 44 according to the present invention.

The optical filter module 43 is provided with a BPF1-1 for which λ1 is set as a passing center wavelength and 1530±1 [nm] or the like is set as a passing wavelength band, a BPF1-2 for which λ2 is set as a passing center wavelength and 1540±2 [nm] or the like is set as a passing wavelength band, and optical couplers 6-1, 6-2. The port 2-1a is connected with the transmission path at the East side and receives the WDM (λ1,λ2). And, the ASE light power Pa2 of the output signal of the optical amplifier 42 is monitored from the port 2-1d. The optical coupler 6-1 is provided between the ports 2-1b, 2-2d and monitors the power P1 of the S (λ1) transmitted through the BPF1-1, and the optical coupler 6-2 is provided between the port 2-2b and the input terminal of the optical amplifier 41 and monitors the power P2 of the multiple light of the S (λ1) transmitted through the BPF1-1 and the S (λ2) transmitted through the BPF1-2.

The optical filter module 44 is provided with a BPF1-3 which λ3 is set as a passing center wavelength and 1550±1 [nm] or the like is set as a passing wavelength band, a BPF1-4 for which λ4 is set as a passing center wavelength and 1570±1 [nm] or the like is set as a passing wavelength band, and optical couplers 6-3, 6-4. The port 2-3a is connected with the transmission path at the West side and receives the WDM (λ3,λ4). And, the ASE light power Pa1 of the output signal of the optical amplifier 41 is monitored from the port 2-3c. The optical coupler 6-3 is provided between the ports 2-3a, 2-4c and monitors the power P3 of the S (λ3) transmitted through the BPF1-3, and the optical coupler 6-4 is provided between the port 2-4a and the input terminal of the optical amplifier 42 and monitors the power P4 of the multiple light of the S (λ3) transmitted through the BPF1-3 and the S (λ4) transmitted through the BPF1-4.

Next, the explanation will be given of the operation of the bidirectional optical amplification repeater in FIG. 11. When the WDM (λ1,λ2) is inputted to the bidirectional optical amplification repeater from the East side, the S (λ1) light components transmits through the BPF1-1, and are outputted from the port 2-1b and reflected by the BPF1-2 so as to reach the port 2-2b. The power P1 of the S (λ1) component is monitored by the optical coupler 6-1. And, the S (λ2) component is reflected by the BPF1-1, transmits through the BPF1-2 and reaches the port 2-2b, and then is multiplexed with the S (λ1) component. The multiple transmission light of the S (λ1) and the S (λ2) is amplified by the amplifier 41. The power P2 of the multiple light of the S (λ1) and the S (λ2) is monitored by the optical coupler 6-2. The WDM (λ1,λ2), which is the multiple light of the S (λ1) and the S (λ2), amplified by the optical amplifier 41 is reflected by the BPFs1-4, 1-3, and then outputted from the port 2-3b into the transmission path at the West side. And, the λ3,λ4 components (both ASE light components) transmit through one of the BPFs1-4,1-3 and then are outputted from the port 2-3c.

As above described, the noise light components except for the signal wavelengths of the WDM (λ1,λ2) are eliminated, whereby the amplification efficiency of the optical amplifier 41 can be improved and the accumulation of the noise lights can be reduced. And, the excitation light power of the optical amplifier 41 can be reduced by the above improvement of the amplification efficiency, so that the consumption power of the optical amplifier 41 and the failure rate of the excitation light source can be reduced, and the reliability of the optical amplifier 41 can be improved. And, the noise light power Pa1 is monitored from the port 2-3c, whereby the ASE light level produced in the optical amplifier 41 can be recognized. Therefore, it can be monitored to determine whether there is a performance degradation of an optical amplifier 41. Further, presences and/or levels of the respective signal lights can be perceived by monitoring the P1 and the P2 with the optical couplers 6-1, 6-2.

When the WDM (λ3,λ4) is inputted into the bidirectional optical amplification repeater from the West side, similarly to the above principle, only the S (λ3) the S (λ4) components, which transmits through the BPFs 1-3, 1-4, are amplified by the optical amplifier 42 and outputted into the transmission path at the East side, therefore, it works as an bidirectional optical amplification repeater. And, the power P3 of the S (λ3) component and the power P4 of the multiple light of the S (λ3) and the S (λ4) are monitored by the optical couplers 6-3, 3-4, respectively, and the ASE light level Pa2 of the optical amplifier 42 also is monitored from the port 2-1d.

In addition, when a number of signal lights in the inputted WDM signal light is n-piece, an optical filter module with n-stage BPF may be used. And, an optical filter module shown in FIG. 1 or FIG. 5 may be used instead of the optical filter modules 43, 44.

According to the optical filter module of the second embodiment, passing wavelength bands with plural passing center wavelengths and filter characteristics can be set independently, the noise light level of the inputted WDM signal light can be perceived, and multiplex-demultiplex output lights from the respective BPFs are branched respectively and the powers thereof are monitored, whereby presences and levels of the respective signal lights in the inputted WDM signal light can be perceived.

Further, an optical amplification apparatus such as a bidirectional optical amplification repeater is fabricated with an optical filter module of the second embodiment, so that the optical amplification can operate at a low noise light output, a high amplification efficiency, a low consumption power and a high reliability, and a presence of a performance degradation in an optical amplifier can be monitored and a presence and a level of an input-output signal light can be perceived.

Figure 12:
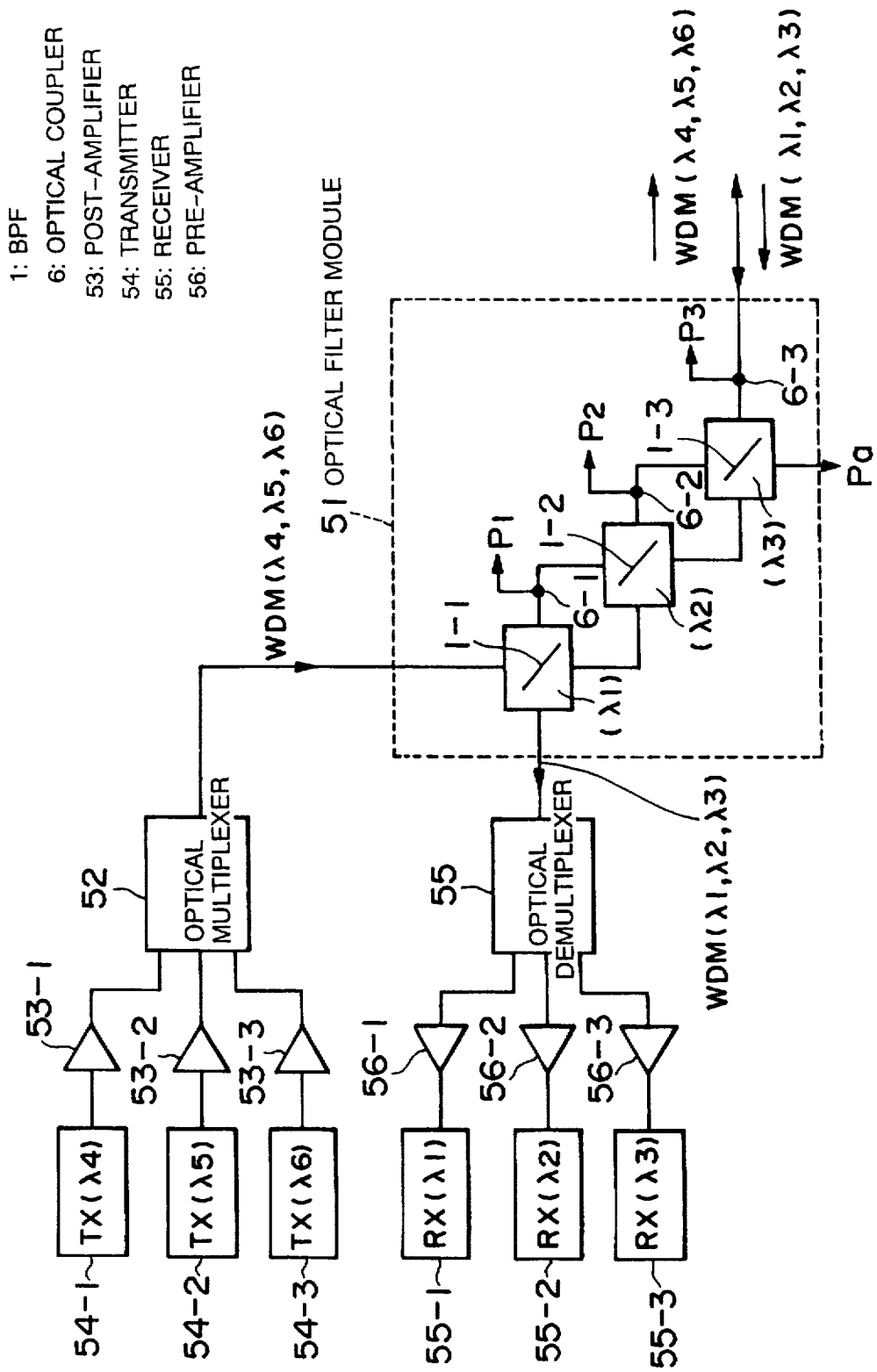
FIG. 12 is a view showing a sample in which an optical filter module according to the second embodiment of the present invention is applied to a optical transmitter-receiver.

In addition, this optical filter module may be applied to an optical transmitter-receiver, or may be arranged in a transmission path alone. FIG. 12 shows an application sample of an optical transmitter- receiver. The optical transmitter-receiver shown in FIG. 12 is provided with an optical filter module 51, an optical multiplexer 52 multiplexing transmission light signals of $\lambda 4$, $\lambda 5$, $\lambda 6$ to a WDM signal light, post-amplifier 53-1 . . . 53-3, transmitters (TX) 54-1 . . . 54-3, an optical demultiplexer 55 demultiplexing a received WDM signal light to signal lights of $\lambda 1$, $\lambda 2$, $\lambda 3$, post-amplifier 56-1 . . . 56-3, and receivers (RX) 57-1 . . . 57-3.

The optical filter module 51 is provided with BPFs 1-1 . . . 1-3 of which passing center wavelengths are $\lambda 1$, $\lambda 2$, $\lambda 3$, respectively, and optical couplers 6-1 . . . 6-3 for monitoring output light powers of the BPFs 1-1 . . . 1-3. The WDM ($\lambda 4, \lambda 5, \lambda 6$) from the optical multiplexer 52 is reflected by the BPFs 1-1 . . . 1-3 and outputted into the transmission paths. The respective BPF output powers of the WDM ($\lambda 4, \lambda 5, \lambda 6$) are monitored with the optical couplers 6-1 . . . 6-3, and the power Pa of the ASE light components is also monitored. And, the WDM ($\lambda 1, \lambda 2, \lambda 3$) from the transmission path is filtered with the BPFs 1-1 . . . 1-3 and inputted into the optical demultiplexer 55. Therefore, an optical transmitter-receiver with a low noise light output, a high amplification efficiency, a low consumption power and a high reliability can be fabricated.

In the first and second embodiments, BPF modules are connected with optical fibers to fabricate an optical filter module, however, beam connection with reflecting mirrors can be also applied to an optical filter module.

EXAMPLE 3

Figure 13:
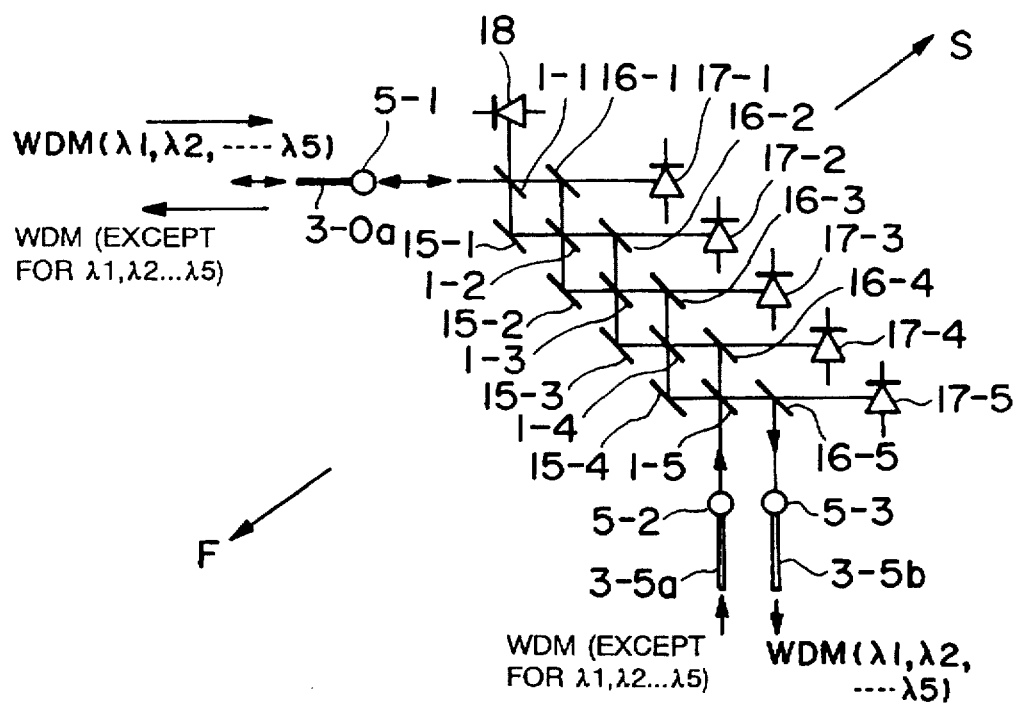
FIG. 13 is a view showing a structure of an optical filter module according to the third embodiment of the present invention.

FIG. 13 is a view showing a structure of an optical filter module according to the third embodiment of the present invention, in which reflecting mirrors are applied. The optical filter module in FIG. 13 is provided with BPFs 1-1 . . . 1-5, 100% reflecting mirrors 15-1 . . . 15-4, 95% reflecting mirrors 16-1 . . . 16-5, and a PIN photo-diode 18 for monitoring the ASE. Each external connection port is connected with the transmission path optical fiber 3 through the lens 5.

When a BPF surface toward a direction of an arrow F is called a first surface and a BPF surface toward a direction of an arrow S is called a second surface, the 100% reflecting mirror 15-k (k=1,2,3,4) beam-connects the first surfaces of the BPF 1-k and the BPF 1-(k+1), and the 95% reflecting mirror 16-k beam-connects the second surfaces of the BPF 1-k and the BPF 1-(k+1). And, the 95% reflecting mirrors 16-k and 16-5 transmit a partly light quantity (5%) of the incident light so as to output it into each of the PIN photo-diode 17 as a branch light of the output light from the BPF 1-k. The ASE light components (except for $\lambda 1, \lambda 2 \ldots \lambda 5$) in the WDM (except for $\lambda 1, \lambda 2 \ldots \lambda 5$) inputted from the transmission path optical fiber 3-5a are outputted into the PIN photo-diode 18.

According to the optical filter module of the third embodiment, the optical fiber connections are used only for the external connection ports, so that an optical filter module of a low loss can be obtained. And, since parts therefor can be reduced, it is possible to miniaturize an optical filter module and to reduce cost. Further, the optical amplification apparatus is fabricated with this optical filter module, whereby a low-noise-index, small and low-cost optical amplification apparatus can be obtained.

Figure 14:
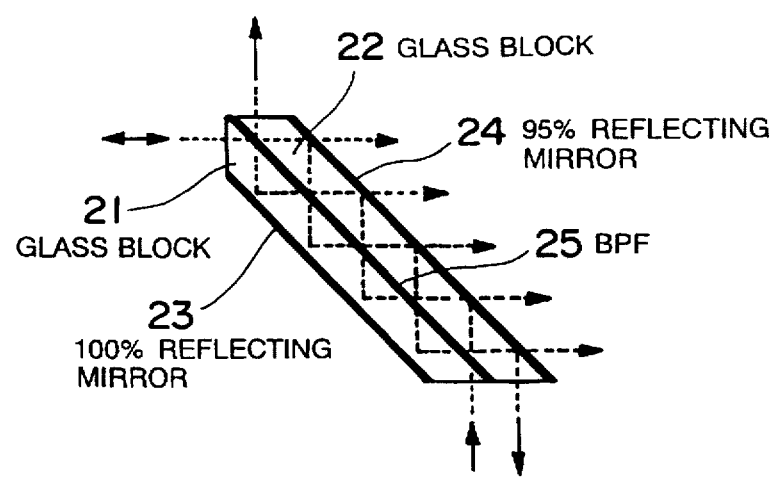
FIG. 14 is a view showing a structure of another optical filter module according to the third embodiment of the present invention.
Figure 15:
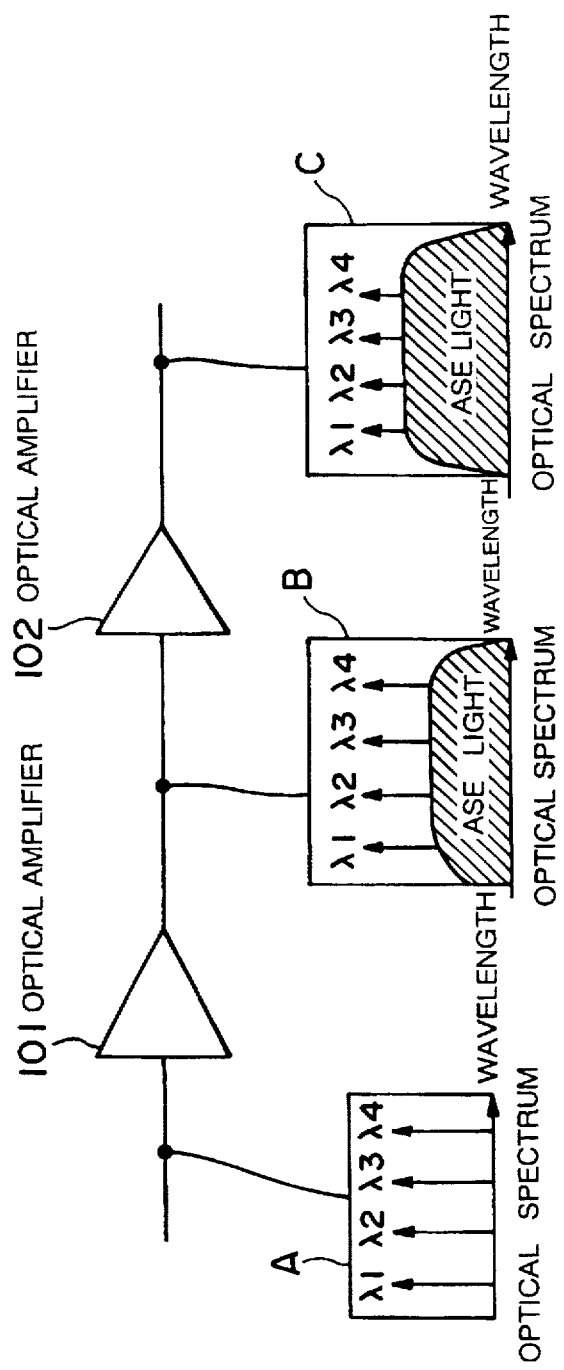
FIG. 15 is a structural view of an WDM optical transmission system.
Figure 16:
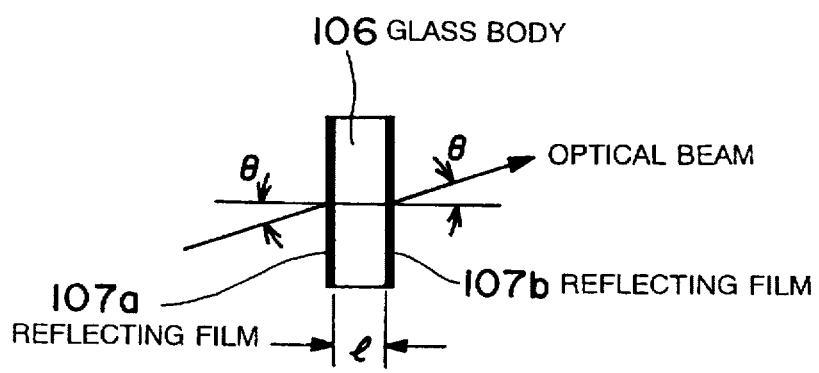
FIG. 16 is a view showing a structure of a Fabry-Perot etalon which is an example of the conventional plural wavelength optical filter; and,.
Figure 17:
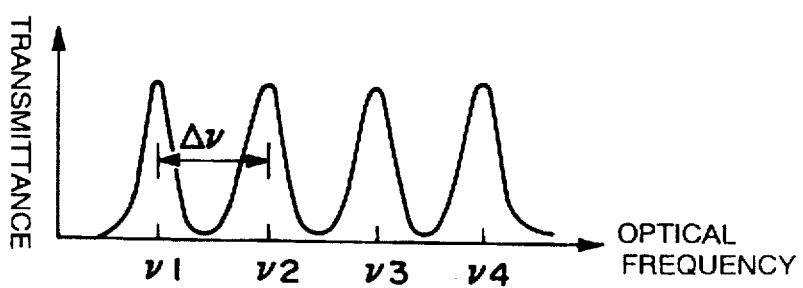
FIG. 17 is a view showing a filter characteristic of the Fabry-Perot etalon.

In addition, as shown in FIG. 14, a BPF and reflecting mirrors may be integrated. The optical filter module in FIG. 14 is a glass body, in which a glass block 21 of which one side is evaporated with a 100% reflecting film 23 and the other side is evaporated with the BPF 25 and a glass block 22 of which one side is evaporated with a 95% reflecting film 24, are put together. The BPF 25 has a characteristic that a passing center wavelength varies between $\lambda 1$ and $\lambda n$ corresponding to positions. Therefore, the optical filter module in FIG. 14 can still more reduce parts to a greater expert than that in FIG. 13.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An optical filter module comprising:

a first band pass filter which has a first passing center wavelength, for receiving an input light signal, for transmitting a first wavelength light signal as a first transmitted light signal and for reflecting an other wavelength light signal as a first reflected light signal;

a second band pass filter which has a second passing center wavelength, for receiving the first reflected light signal, for transmitting a second wavelength light signal as a second transmitted light signal and for reflecting an other wavelength light signal as a second reflected light signal; and optical multiplexer means for multiplexing the first transmitted light signal and the second transmitted light signal.

2. The optical filter module according to claim 1 wherein the optical multiplexer means is comprised of the second band pass filter which has a first external connection port to make incident the first reflected light signal onto a first surface of the second band pass filter and a second external connection port to make incident the first transmitted light signal onto a second surface of the second band pass filter, so that the first transmitted light signal and the second transmitted light signal are multiplexed.

3. The optical filter module according to claim 1 further comprising:

light signal monitoring means for monitoring a status of the first wavelength light signal based on the first transmitted light signal.

4. The optical filter module according to claim 1 further comprising: noise light monitor means for monitoring a noise light based on the second reflected light signal.

5. The optical filter module according to claim 1 wherein said first band pass filter and said second band pass filter are that an effective area of one band pass filter of which passing center wavelength varies corresponding to positions is divided into two pieces and represent divided areas are allocated.

6. An optical filter module comprising:

a first band pass filter which has a first passing center wavelength, having a first external connection port, a second external connection port, a third external connection port and a fourth external connection port, wherein the third external connection port outputs (i) light signals having the first wavelength and received from the first external connection port by transmission through the first band pass filter and (ii) other wavelengths received from the second external connection port by reflection of the first band pass filter, and wherein the fourth external connection port outputs (i) light signals having the first wavelength and received from the second external connection port by transmission through the first band pass filter and (ii) other wavelengths received from the first external connection port by reflection of the first band pass filter; and a second band pass filter which has a second passing center wavelength, having a fifth external connection port which is coupled to the fourth external connection port, a sixth external connection port which is coupled to the third external connection port, a seventh external connection port and an eighth external connection port, wherein the seventh external connection port outputs (i) light signals having the second wavelength and received from the fifth external connection port by transmission through the second band pass filter and (ii) other wavelengths received from the sixth external connection port by reflection of the second band pass filter, and wherein the eighth external connection port outputs (i) light signals having the second wavelength and received from the sixth external connection port by transmission through the second band pass filter and (ii) other wavelengths received from the fifth external connection port by reflection of the second band pass filter.

7. An optical amplification apparatus comprising:

a first optical filter module for receiving an input light signal and for separating a filtered light signal from an other input light signal, said module having:

a first external connection port for receiving the input light signal, a second external connection port for outputting the filtered light signal, and a third external connection port for outputting the other input light signal;

optical amplification apparatus having:

a first optical amplifier coupled to the second external connection port for amplifying the filtered input light signal;

a second optical amplifier coupled to the third external connection port; and a second optical filter module coupled to the first optical amplifier and the second optical amplifier for filtering the filtered input light signal which is received from the first optical amplifier.

8. The optical amplification apparatus according to claim 7 wherein the optical amplification apparatus is a bi-directional optical amplification apparatus.

9. The optical amplification apparatus according to claim 7 wherein said first optical filter module comprises:

a first band pass filter which has a first passing center wavelength for receiving the input light signal, for transmitting a first wavelength light signal as a first transmitted light signal and for reflecting an other wavelength light signal as a first reflected light signal;

a second band pass filter which has a second passing center wavelength for receiving the first reflected light signal, for transmitting a second wavelength light signal as a second transmitted light signal and for reflecting an other wavelength light signal as the other input light signal; and optical multiplexer means for multiplexing the first transmitted light signal and the second transmitted light signal as the filtered light signal.

10. The optical amplification apparatus according to claim 9 wherein the optical multiplexer means is comprised of the second band pass filter which has a first external connection port to make incident the first reflected light signal onto a first surface of the second band pass filter and a second external connection port to make incident the first transmitted light signal onto a second surface of the second band pass filter, so that the first transmitted light signal and the second transmitted light signal are multiplexed as the light signal.

11. An optical amplification apparatus comprising:

a first optical amplifier which outputs an amplified light signal;

an optical filter module having:

a first band pass filter which has a first passing center wavelength for receiving the amplified light signal, for transmitting a first wavelength light signal as a first transmitted light signal and for reflecting an other wavelength light signal as a first reflected light signal, a second band pass filter which has a second passing center wavelength for receiving the first reflected light signal, for transmitting a second wavelength light signal as a second transmitted light signal and for reflecting an other wavelength light signal as a second reflected light signal, and optical multiplexer means for multiplexing the first transmitted light signal and the second transmitted light signal as a filtered light signal; and a second optical amplifier which receives the filtered light signal and amplifies the filtered light signal.

12. The optical amplification apparatus according to claim 11 further comprising:

noise light monitor means for monitoring a noise light based on the second reflected light signal.

* * * * *